United States Patent
Bodano et al.

(10) Patent No.: US 10,263,518 B2
(45) Date of Patent: *Apr. 16, 2019

(54) SYSTEM AND METHOD FOR SWITCHED POWER SUPPLY WITH DELAY MEASUREMENT

(71) Applicant: Infineon Technologies AG, Neubiberg (DE)

(72) Inventors: Emanuele Bodano, Villach (AT); Luca Bizjak, Villach (AT); Maria Lagioia, Villach (AT); Joachim Pichler, Landskron (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/422,082

(22) Filed: Feb. 1, 2017

(65) Prior Publication Data

US 2017/0149334 A1    May 25, 2017

Related U.S. Application Data

(63) Continuation of application No. 14/294,418, filed on Jun. 3, 2014, now Pat. No. 9,570,980.

(51) Int. Cl.
| | |
|---|---|
| *H02M 3/157* | (2006.01) |
| *H02M 3/156* | (2006.01) |
| *G05F 1/61* | (2006.01) |
| *G05F 1/59* | (2006.01) |
| *H02M 3/158* | (2006.01) |
| *H02M 1/08* | (2006.01) |

(Continued)

(52) U.S. Cl.
CPC ............. *H02M 3/157* (2013.01); *G05F 1/59* (2013.01); *G05F 1/61* (2013.01); *H02M 1/08* (2013.01); *H02M 1/32* (2013.01); *H02M 3/156* (2013.01); *H02M 3/158* (2013.01); *H02M 2001/0009* (2013.01)

(58) Field of Classification Search
CPC .................................................... H02M 3/157
See application file for complete search history.

(56) References Cited

U.S. PATENT DOCUMENTS

| | | | |
|---|---|---|---|
| 2004/0036458 A1* | 2/2004 | Johnson | H02M 3/158 323/282 |
| 2005/0206358 A1 | 9/2005 | Van Der Horn et al. | |

(Continued)

FOREIGN PATENT DOCUMENTS

| | | |
|---|---|---|
| CN | 100477465 C | 4/2009 |
| CN | 102282473 A | 12/2011 |

(Continued)

*Primary Examiner* — Jue Zhang
*Assistant Examiner* — Trinh Q Dang
(74) *Attorney, Agent, or Firm* — Slater Matsil, LLP

(57) ABSTRACT

According to an embodiment, a method of operating a switching power supply includes applying a periodic switching signal to a first switch that is coupled to an output node, detecting an offset delay between applying the periodic switching signal and a change in voltage of the output node, calculating a corrected midpoint of a half phase of the periodic switching signal based on the offset delay, generating a sampling pulse based on the corrected midpoint, and sampling a current at the output node according to the sampling pulse.

20 Claims, 9 Drawing Sheets

(51) Int. Cl.
*H02M 1/32* (2007.01)
*H02M 1/00* (2006.01)

(56) References Cited

U.S. PATENT DOCUMENTS

| | | |
|---|---|---|
| 2005/0207181 A1 | 9/2005 | Halberstadt et al. |
| 2006/0227860 A1 | 10/2006 | Leung et al. |
| 2007/0222395 A1 | 9/2007 | Chen et al. |
| 2009/0237053 A1* | 9/2009 | Gan .................. H02M 3/156 323/283 |
| 2009/0295350 A1* | 12/2009 | Yamada ............ H02M 3/1588 323/282 |
| 2009/0322292 A1* | 12/2009 | Augustyniak ......... G05F 1/573 323/277 |
| 2010/0066328 A1 | 3/2010 | Shimizu et al. |
| 2010/0131219 A1 | 5/2010 | Kenly et al. |
| 2010/0315055 A1 | 12/2010 | Miyazaki |
| 2010/0327825 A1 | 12/2010 | Mehas et al. |
| 2012/0194161 A1 | 8/2012 | Latham, II et al. |
| 2012/0217946 A1 | 8/2012 | Ju |
| 2012/0242314 A1* | 9/2012 | Namekawa ............ H03K 7/08 323/283 |

FOREIGN PATENT DOCUMENTS

| | | |
|---|---|---|
| CN | 103280970 A | 9/2013 |
| CN | 103404012 A | 11/2013 |

* cited by examiner

SYSTEM AND METHOD FOR SWITCHED POWER SUPPLY WITH DELAY MEASUREMENT

This application is a continuation of U.S. application Ser. No. 14/294,418, filed on Jun. 3, 2014, and entitled "System and Method for Switched Power Supply Current Sampling", which application is hereby incorporated herein by reference in its entirety.

TECHNICAL FIELD

The present invention relates generally to a system and method for electronic switches, and, in particular embodiments, to a system and method for switched power supply current sampling.

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switched mode power supplies (SMPS). An SMPS is usually more efficient than other types of power conversion systems because power conversion is performed by controlled charging and discharging of the inductor or transformer and reduces energy lost due to power dissipation across resistive voltage drops.

An SMPS usually includes at least one switch and an inductor or transformer. Some specific topologies include buck converters, boost converters, and flyback converters, among others. A control circuit is commonly used to open and close the switch to charge and discharge the inductor. In some applications, the current supplied to the load and/or the voltage supplied to the load is controlled via a feedback loop.

In some power supply applications, a switched mode power supply may be operated in two modes of operation: pulse frequency modulation (PFM) and pulse width modulation (PWM). During PFM, the frequency of control signals applied to the switch(es) may be modified according to some control logic and a feedback signal. During PWM, the pulse width of control signals applied to the switch(es) may be modified according to the control logic and feedback signal.

SUMMARY OF THE INVENTION

According to an embodiment, a method of operating a switching power supply includes applying a periodic switching signal to a first switch that is coupled to an output node, detecting an offset delay between applying the periodic switching signal and a change in voltage of the output node, calculating a corrected midpoint of a half phase of the periodic switching signal based on the offset delay, generating a sampling pulse based on the corrected midpoint, and sampling a current at the output node according to the sampling pulse.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
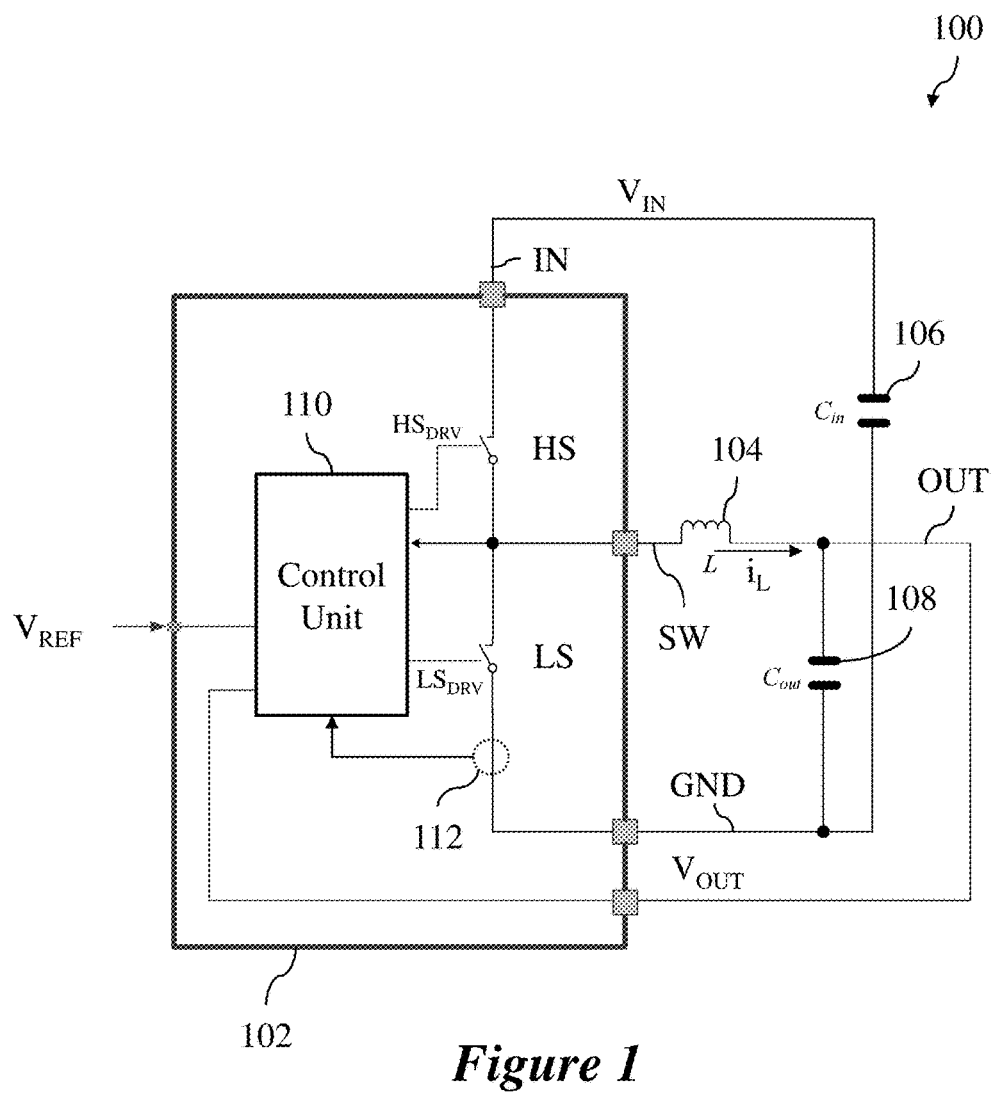
FIG. 1 illustrates a schematic diagram of an embodiment buck converter.

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely switched power supplies, and more particularly, current sampling in switched mode power supplies. Some of the various embodiments described herein include electronic switches, buck converters, digital logic, digital controllers and counters for calculation of current sampling time in switched mode power supplies, and further embodiments. In other embodiments, aspects may also be applied to other applications involving any type of switched power electronic circuit according to any fashion as known in the art. For example, any type of switched mode power supply (SMPS) may operate according to embodiments described herein, such as buck converters, boost converters, buck-boost converters, or others.

According to various embodiments, in an SMPS system operated in steady state, such as a buck converter for example, the average coil current is proportional to, or approximately equal to, the current provided to a load. In one example, boost converter SMPS systems have an average coil current proportional to the output current and related to the input voltage. As a first order approximation, the average coil current $i_{L\_AVG}$ is equal to $i_{OUT} \cdot (V_{OUT}/V_{IN})$ in such cases. Further, the coil current $i_L$ is one of two state variables for an SMPS. Thus, coil current may be useful during operation and, in some embodiments, to improve system features including efficiency and performance.

As an example, coil current may be used to estimate output current in a buck converter and to select an appropriate mode of operation in order to increase efficiency. In one embodiment, the coil current is used to select between pulse frequency modulation (PFM) for light system loads and pulse width modulation (PWM) for middle to heavy system loads.

In various embodiments, an average current value may be measured at a middle point of the rising or falling current slope in a coil attached between a high side and a low side switch. The average current may be measured because the coil current is shaped as a triangular wave. According to such embodiments, a digital controller and a digital counter is used to generate PWM signals for driving high and low side power switches. The digital counter may be used to define a counter value at which the sampled coil current reflects the average current. For example, the midpoint at which the current is approximately the average current is equal to a counter value corresponding to half the on-time $T_{ON}/2$ or half the off-time $T_{OFF}/2$, where the on-time $T_{ON}$ is the time period when the high side switch is driven into a conducting state and the off-time $T_{OFF}$ is the time period when the low side switch is driven into a conducting state.

However, calculations based purely on the digital PWM signal may generate a delay offset because of numerous possible delays within the system. For example, an analog driver that drives high and low side switches introduces a delay with respect to the digital PWM signal. Further, the finite switching time of the high and low side switches may also generate a delay. Thus, a calculated midpoint of the high or low side switches based only on the digital PWM signal may introduce a delay offset leading to incorrectly sampled coil current $i_L$ that is not equal to the average coil current $i_{L\_AVG}$. In some cases, errors in the measured average current may lead to less efficient operation of the SMPS. Thus, according to embodiments described herein, the current measurement point is calculated with correction for a delay offset between applied control signals and actual switching. The measurement point and correction are generated in a control loop including a feedback signal based on an output node coupled to a switch or switches in an SMPS.

FIG. 1 illustrates a schematic diagram of an embodiment buck converter 100 including switching circuit 102 coupled to inductor 104. According to various embodiments, switching circuit 102 receives input voltage $V_{IN}$ on input node IN and controls high side switch HS and low side switch LS to supply output node OUT with output voltage $V_{OUT}$ through switching node SW and inductor 104. Control unit 110 generates switching signals $HS_{DRV}$ and $LS_{DRV}$ for driving high side switch HS and low side switch LS based on reference voltage $V_{REF}$ and feedback from output voltage $V_{OUT}$ on output node OUT.

According to various embodiments, a load is coupled to output node OUT. Capacitors 106 and 108 represent the input and output capacitance, respectively. Output voltage $V_{OUT}$ is supplied to output node OUT and any load coupled thereto while input node IN receives a supply input voltage $V_{IN}$.

According to various embodiments, inductor current $i_L$ is used as control information in control unit 110. For example, switching operation modes between PWM and PFM for low or high load conditions, as mentioned above, may depend on determining an average inductor current $i_{L\_AVG}$. In order to simplify a calculation of average inductor current $i_{L\_AVG}$, inductor current ii, may be measured at a point in the switching cycle when inductor current $i_L$ is equal to the average inductor current $i_{L\_AVG}$. In some embodiments, a midpoint in each half period of the switching cycle corresponds to the average current flowing in the inductor. In various embodiments, there exists a delay between the switching signals $HS_{DRV}$ and $LS_{DRV}$ and an actual change in reference between input voltage $V_{IN}$ and low reference $V_{GND}$ at switching node SW. Thus, control unit 110 detects a delay time or delay offset and calculates a middle point in either half period of the switching cycle with a correction for the detected delay offset. Based on the calculated middle point, control unit no measures inductor current $i_L$ through measurement circuit 112. In various embodiments, the delay offset is detected by comparing the switching voltage $V_{SW}$ to switching signals generated within control unit 110, as is described in more detail below in reference to the other figures.

Figure 2:
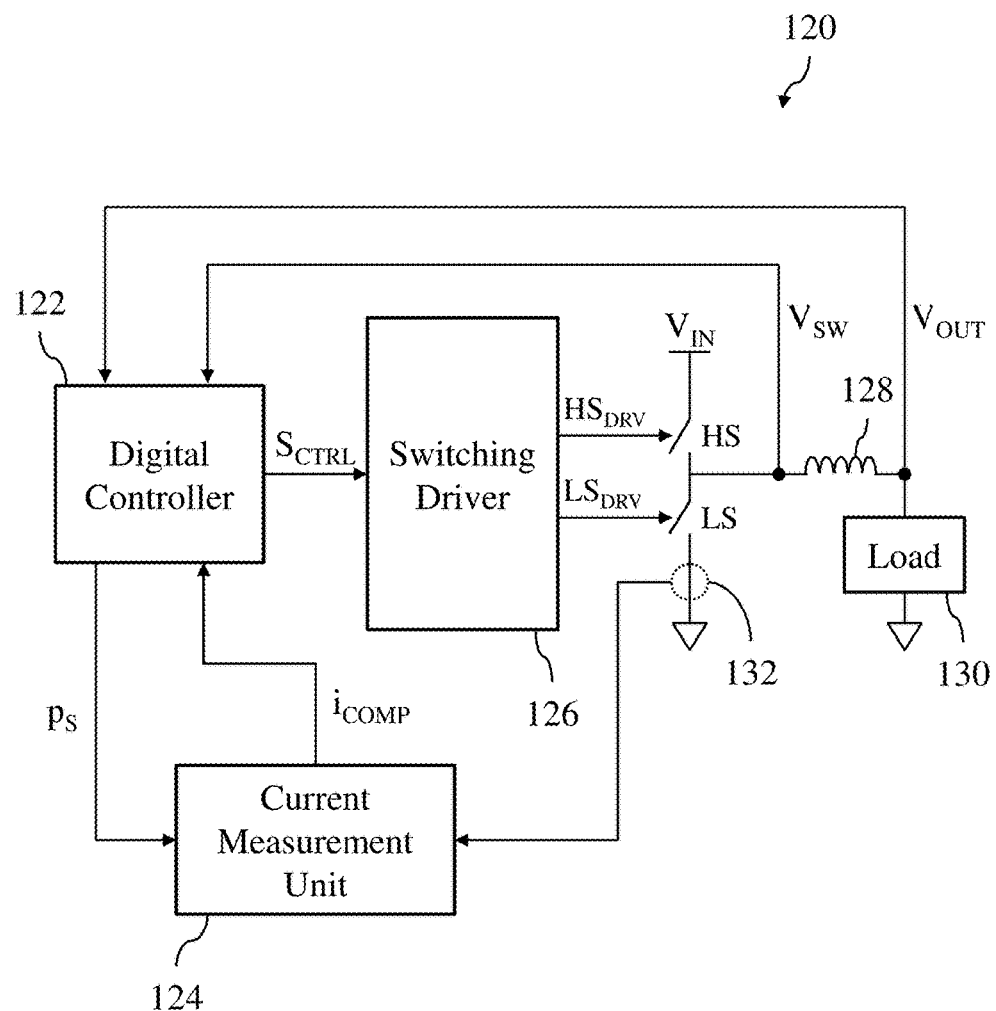
FIG. 2 illustrates a top level diagram of an embodiment switched mode power supply.

FIG. 2 illustrates a top level diagram of an embodiment switched mode power supply 120 including digital controller 122, current measurement unit 124, switching driver 126, high side switch HS, low side switch LS, inductor 128, and load 130. According to various embodiments, digital controller 122 determines a sample measurement time based on a switching signal frequency and a detected delay offset that is determined by monitoring switching control signal $S_{CTRL}$ and switching voltage $V_{SW}$. Digital controller 122 supplies a sample pulse $p_S$, based on the determined measurement time, to current measurement unit 124, which, upon receiving sample pulse $p_S$, measures inductor $i_L$ through current measurement circuit 132. According to various embodiments, current measurement circuit 132 may be implemented in numerous ways and may be coupled to high side switch HS or low side switch LS. In the embodiment shown, current measurement circuit 132 is coupled to low side switch LS. In such embodiments, the inductor current is measured during the half period in the switching cycle when low side switch LS is driven in a conducting state. Switching control signal $S_{CTRL}$ supplies the switching control signals to switching driver 126, which then supplies the drive signals for the high and low side switches HS and LS.

In various embodiments, digital controller 122 may receive a current comparison result $i_{COMP}$ from current measurement unit 124. Current comparison result $i_{COMP}$ may indicate that the average inductor current $i_{L\_AVG}$ is above or below a current threshold $i_{thresh}$. Current threshold $i_{thresh}$ may be set for changing operation modes in some embodiments. For example, digital controller 122 may be operated to supply switching control signal $S_{CTRL}$ as a PWM signal in a first operation mode and as a PFM signal in a second operation mode. In such embodiments, current threshold $i_{thresh}$ is used to indicate a transition between the first and second operation mode. In one embodiment, the first operation mode is used for high load conditions and the second operation mode is used for low load conditions and current threshold $i_{thresh}$ corresponds to the threshold between low and high load conditions.

According to various other embodiments, other types of operations or control schemes may be used based on the measured average inductor current $i_{L\_AVG}$. For example, any number of operation modes may be used along with multiple thresholds. In other embodiments, average inductor current $i_{L\_AVG}$ is used as a feedback signal to regulate switching control signal $S_{CTRL}$. According to various further embodiments, a multiphase converter may control the current sharing between phases based on measured average inductor current $i_{L\_AVG}$. In one example embodiment, error condition detection, such as detecting overload, overcurrent, or short circuit conditions, may be based on measured average inductor current $i_{L\_AVG}$. The measured average inductor current $i_{L\_AVG}$ may also be used for droop compensation in point of load topologies, for example. As another example, in a large server system, the measured average inductor current $i_{L\_AVG}$ may be used as feedback to regulate cooling in the server or other system characteristics. In battery powered systems, the measured average inductor current $i_{L\_AVG}$ may be used to regulate or monitor battery charging. In photovoltaic systems, the measured average inductor current $i_{L\_AVG}$ may be used to perform maximum power point tracking (MPPT) during operation. In some embodiments, measured average inductor current $i_{L\_AVG}$ may be used to regulate the current in an LED driver system. In still other embodiments, the measured average inductor current $i_{L\_AVG}$ may be useful for adaptive power switches with gate partitioning. The other figures below discuss more details of specific embodiments for measuring the average inductor current $i_{L\_AVG}$ with delay offset compensation.

Figure 3:
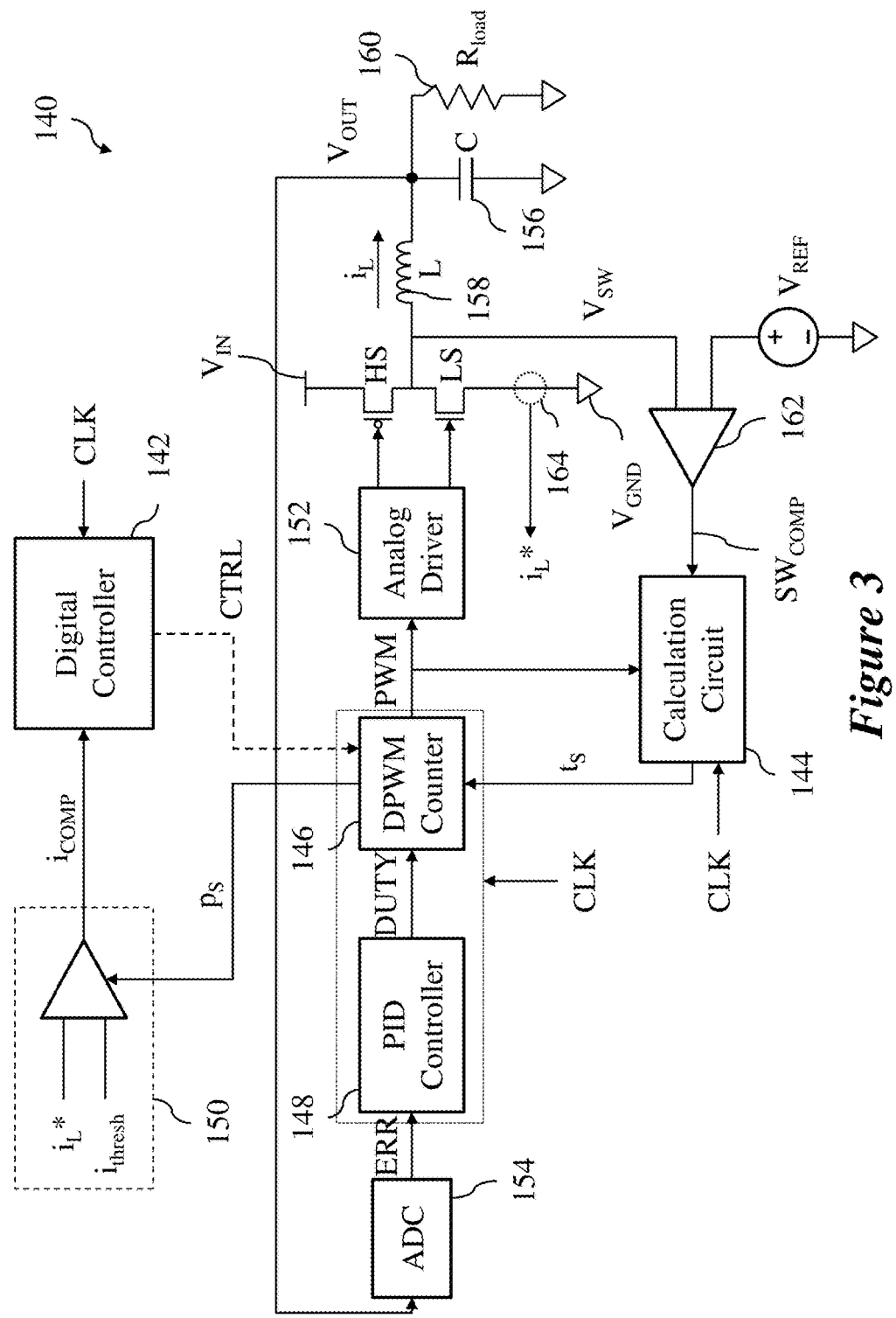
FIG. 3 illustrates a block diagram of another embodiment switched mode power supply.

FIG. 3 illustrates a block diagram of another embodiment switched mode power supply (SMPS) 140 including, in part, digital controller 142, calculation circuit 144, digital pulse width modulation (DPWM) counter 146, proportional integral derivative (PID) controller 148, and current comparison circuit 150. According to various embodiments, DPWM counter 146 supplies modulated switching signal PWM to analog driver 152, which converts modulated switching signal PWM to analog drive signals for high side switch HS and low side switch LS. Based on the modulated switching signal PWM, high side switch HS and low side switch LS couple either input voltage $V_{IN}$ or low reference voltage $V_{GND}$ to inductor 158. In operation, inductor 158 supplies a load current $i_L$ to a load, modeled by resistor 160 with resistance $R_{load}$. Output capacitor 156 may stabilize output voltage $V_{OUT}$.

In various embodiments, DPWM counter 146 may generate modulated switching signal PWM based on a duty cycle DUTY received from PID controller 148 or control signals CTRL received from digital controller 142. In some embodiments, PID controller 148 adjusts duty cycle DUTY based on feedback signal ERR from analog to digital converter (ADC) 154, which monitors output voltage $V_{OUT}$. In various embodiments, the various components in SMPS 140 may be implemented as digital components in a microcontroller or an application specific integrated circuit (ASIC), for example. In one specific embodiment, calculation circuit 144, PID controller 148, DPWM counter 136, and digital controller 142 are implemented using synchronous digital logic that receives clock signal CLK. In such embodiments, each component may be implemented as a separate chip or each component may be implemented in a single microcontroller or ASIC. In other embodiments, each component may receive various other clock signals or some components may be implemented as asynchronous digital logic. In alternative embodiments, the various components in SMPS 140 may be implemented as analog circuits.

According to various embodiments, calculation circuit 144 receives a comparison signal from comparator 162, which monitors switching voltage $V_{SW}$ through comparison with a reference voltage $V_{REF}$. In some such embodiments, reference voltage $V_{REF}$ is selected to have a value between input voltage $V_{IN}$ and low reference voltage $V_{GND}$ such that output $SW_{COMP}$ of comparator 162 indicates actual switching of high side switch HS and low side switch LS. In other embodiments, comparator 162 may receive a signal proportional to switching voltage $V_{SW}$ or a signal that is a function of switching voltage $V_{SW}$. For example, comparator 162 may receive a filtered or attenuated switching voltage $V_{SW}$ for comparison to reference voltage $V_{REF}$.

In various embodiments, based on output $SW_{COMP}$ of comparator 162, calculation circuit 144 computes the sampling time $t_S$ for obtaining the average current flowing through the inductor, $i_{L\_AVG}$. As discussed briefly above, the middle point in either half period of modulated switching signal PWM is approximately equal to the average current in the inductor $i_{L\_AVG}$. However, there is usually an offset introduced by analog driver 152, high side switch HS, and low side switch LS, for example. In various embodiments, calculation circuit 144 monitors output $SW_{COMP}$ of comparator 162 to detect actual switching of high side switch HS and low side switch LS and compares actual switching to modulated switching signal PWM supplied to analog driver 152. Based on the comparison between actual switching and modulated switching signal PWM, calculation circuit 144 corrects the middle point in a half period by the determined offset and generates an accurate sampling time $t_S$ to be supplied to DPWM counter 146. In such embodiments, DPWM counter 146 generates sampling pulse $p_S$ to be supplied to current comparison circuit 150. Based on sampling pulse $p_S$, current comparison circuit 150 obtains an inductor current measurement $i_L^*$ from current measurement circuit 164 and compares the measured inductor current to a current threshold $i_{thresh}$. The specific current threshold $i_{thresh}$ used may be selected to determine a change in operation between heavy load and light load modes, for example. Other thresholds may be selected as well. The result of the comparison is output to digital controller 142 as current comparison $i_{COMP}$ in order to change operation modes determined by digital controller 142 and controlled through control signals CTRL. In various embodiments, control signals CTRL may be supplied to DPWM counter 146 or other components in SMPS 140.

According to various embodiments, SMPS 140 is operated according to a switching frequency $f_{SW}$ for high side switch HS and low side switch LS and also receives clock signal CLK having a digital frequency $f_{digital}$. In some embodiments, digital frequency $f_{digital}$ is between 1 MHz and 2 GHz, switching frequency $f_{SW}$ is between 1 KHz and 50 MHz, inductor 158 has an inductance between 10 nH and 1 mH, and capacitor 156 has a capacitance between 10 pF and 10 mF. In one specific embodiment, digital frequency $f_{digital}$ is 160 MHz, switching frequency $f_{SW}$ is 2.2 MHz, inductor 158 has an inductance of 4.7 µH, and capacitor 156 has a capacitance of 22 µF. In other embodiments, values outside the specified ranges may be used, as will be recognized by one of skill in the aft.

Figure 4A:
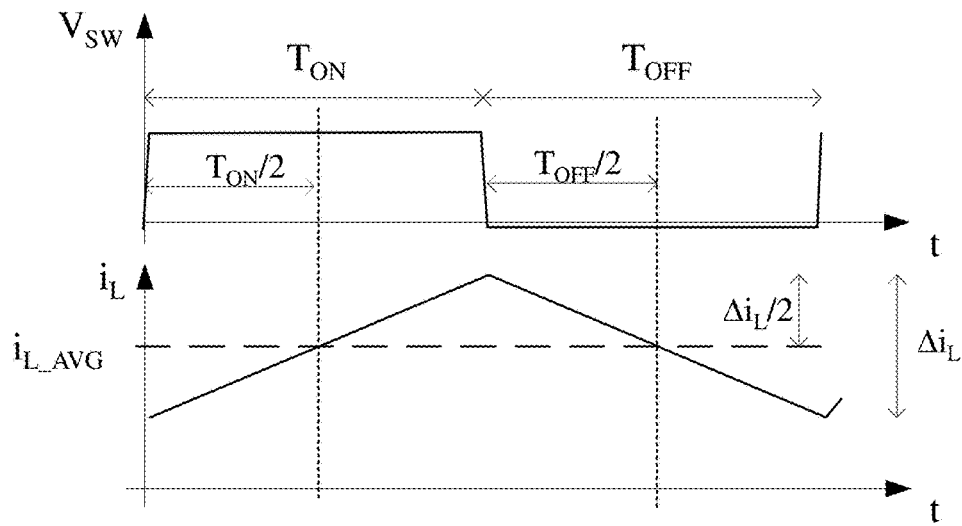
FIGS. 4a and 4b illustrate plots of waveforms from an embodiment switched mode power supply in operation.
Figure 4B:
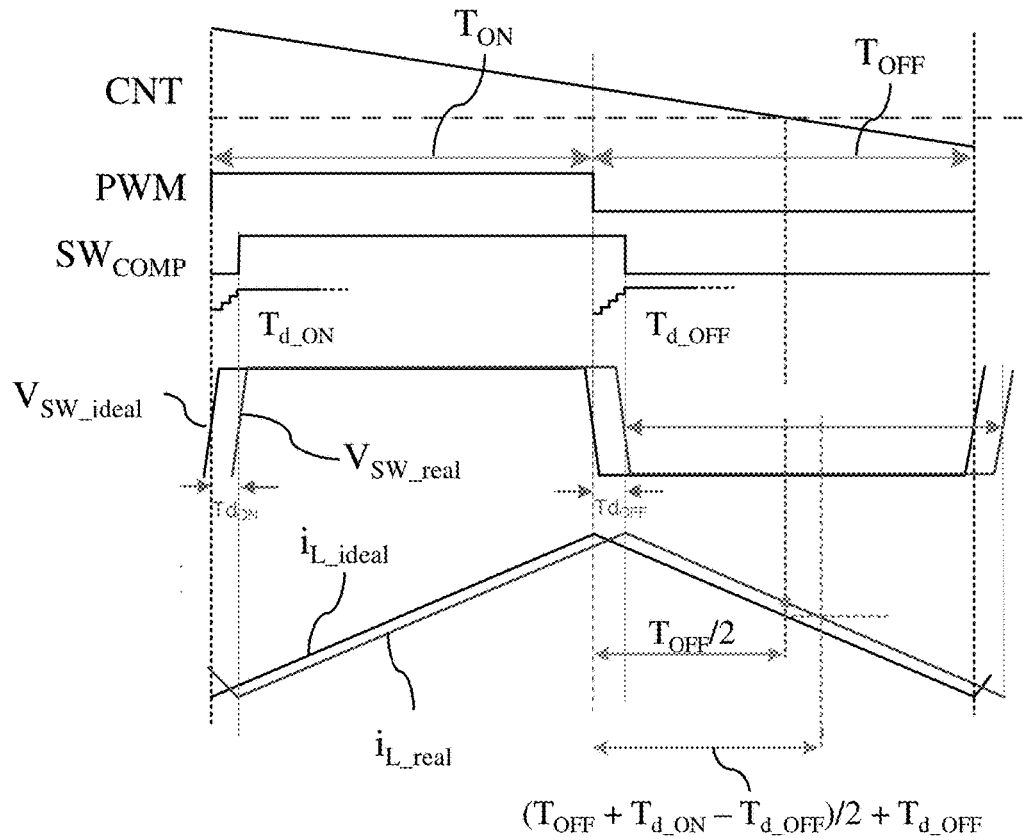

FIGS. 4a and 4b illustrate plots of waveforms from an embodiment switched mode power supply (SMPS) 140 in operation. FIGS. 4a and 4b more clearly illustrate the measurement point for obtaining the average inductor current $i_{L\_AVG}$ and the determined offset correction. FIG. 4a illustrates a plot of two waveforms showing a switching node voltage $V_{SW}$ and the associated inductor current $i_L$. According to various embodiments, switching node voltage $V_{SW}$ indicates an on time $T_{ON}$ half period and an off time $T_{OFF}$ half period. During on time $T_{ON}$, the high side switch HS of SMPS 140 in FIG. 3 is closed, or conducting, and the low side switch LS is open, or non-conducting. Conversely, during the off time $T_{OFF}$, the high side switch HS is open, or non-conducting, and the low side switch LS is closed, or conducting. In various embodiments, the on time $T_{ON}$ and the off time $T_{OFF}$ is not evenly split as half period and either the on time $T_{ON}$ or the off time $T_{OFF}$ may be longer than the other. The duty cycle may be any value from 0% to 100%.

According to various embodiments, inductor current $i_L$ increases during the on time $T_{ON}$ and decreases during off time $T_{OFF}$ as shown. In some embodiments, the waveform of the inductor current $i_L$ may be triangular, as shown. In such embodiments, the midpoint in each time period, i.e., on time $T_{ON}$ or off time $T_{OFF}$, is equal to the average inductor current $i_{L\_AVG}$. FIG. 4a depicts ideal waveform of inductor current $i_L$ for SMPS 140 in FIG. 3. As mentioned above, the current output may include some offset such that the midpoint is not exactly the average inductor current $i_{L\_AVG}$. FIG. 4b addresses the offset calculation and correction.

FIG. 4b illustrates a plot of waveforms showing SMPS 140 in operation including offset delays. According to various embodiments, inductor current $i_L$ is shown by both an ideal current $i_{L\_ideal}$ and a slightly offset real current $i_{L\_real}$. Further, switching is shown by an ideal switching node voltage $V_{SW\_ideal}$ and an offset real switching node voltage $V_{SW\_real}$. Modulated switching signal PWM indicate the ideal switching between high side switch HS and low side switch LS in accordance with ideal on time $T_{ON\_ideal}$ and ideal off time $T_{OFF\_ideal}$. Comparator output $SW_{COMP}$ indicates when real switching node voltage $V_{SW\_real}$ passes reference voltage $V_{REF}$, as described above. In such embodiments, a counter counts an on delay $T_{d\_ON}$ between a rising edge of modulated switching signal PWM and a change in the real switching node voltage $V_{SW\_real}$, as indicated by comparator output $SW_{COMP}$. Similarly, the counter counts an off delay $T_{d\_OFF}$ between a falling edge of modulated switching signal PWM and a change in the real switching node voltage $V_{SW\_real}$, as indicated by comparator output $SW_{COMP}$. In some embodiments, two counters are used to count the on delay and the off delay $T_{d\_ON}$ and $T_{d\_OFF}$, respectively. During this time, a period counter with count value CNT is decrementing down to a count related to the cycle period, which triggers the start of the next cycle. In other embodiments, the full period counter may increment count value CNT up to a preset count related to the cycle period.

According to various embodiments, the on delay $T_{d\_ON}$ or the off delay $T_{d\_OFF}$ may be used to calculate the offset measurement time in the middle of either on time $T_{ON}$ or off time $T_{OFF}$. In the embodiment shown, the middle measurement time is calculated for during off time $T_{OFF}$. As discussed above, the current measured at the middle point in either off time $T_{OFF}$ or on time $T_{ON}$ indicates the average inductor current $i_{L\_AVG}$. In the ideal case, the middle point in the off cycle is equal to $T_{OFF}/2$. In the real case, the middle point is found by adjusting off time $T_{OFF}$ by the difference in the delays and then adding off delay $T_{d\_OFF}$. The resulting adjusted middle point during off time $T_{OFF}$ is equal to $(T_{OFF}+T_{d\_ON}-T_{d\_OFF})/2+T_{d\_OFF}$. Similarly, the adjusted middle point during on time $T_{ON}$ is equal to $(T_{ON}+T_{d\_ON}-T_{d\_OFF})/2-T_{d\_ON}$. Depending on the configuration of the system, either of these middle points may be used as sampling time $t_S$ that is provided to current comparison circuit 150 in FIG. 3. In various embodiments, the calculation of on time $T_{ON}$ and off time $T_{OFF}$ used in the above equation may be obtained from a duty cycle value or other system variables according to methods known by those skilled in the art.

Figure 5:
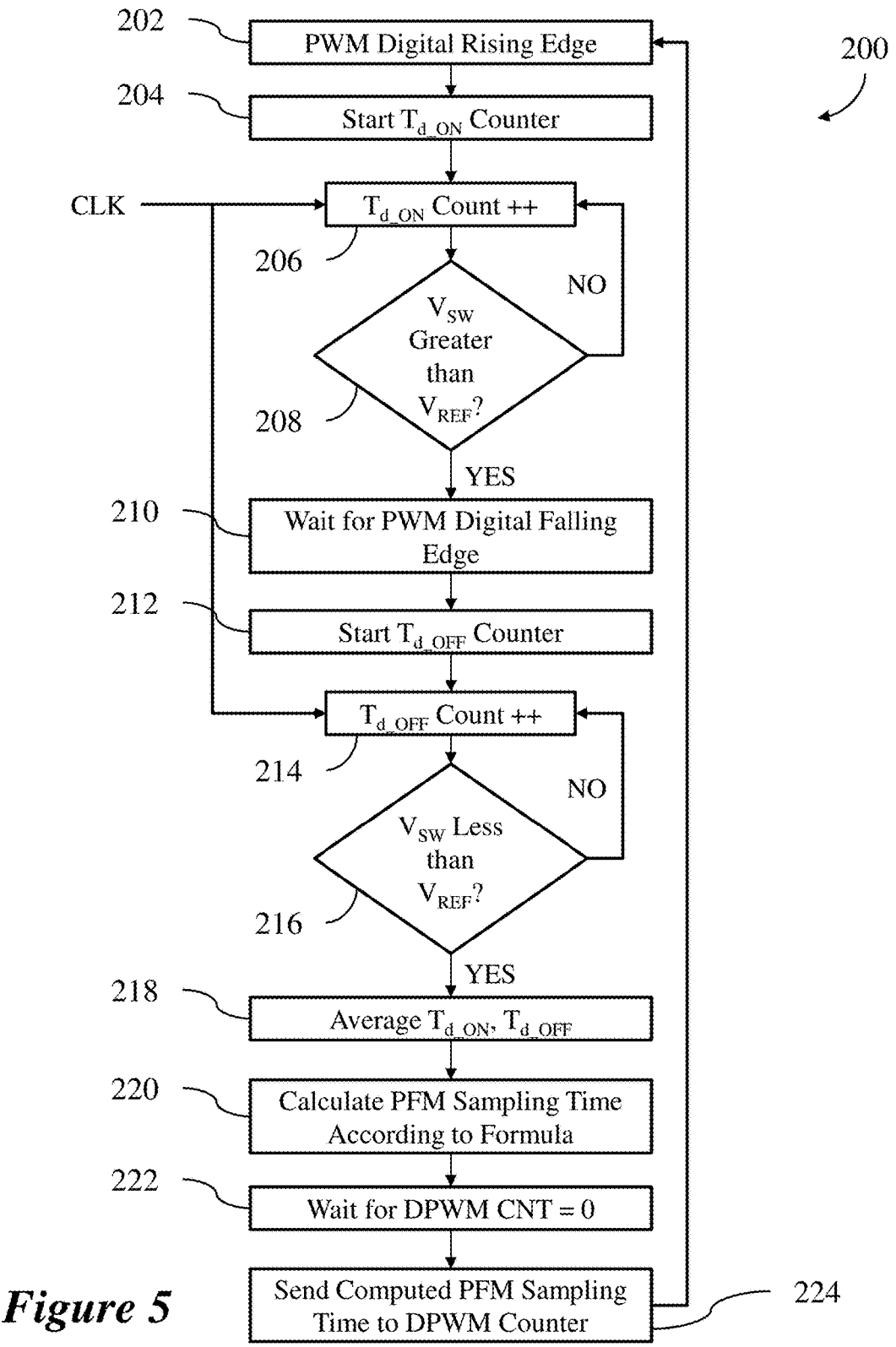
FIG. 5 illustrates a flowchart diagram of a method of operation of an embodiment switched mode power supply.

FIG. 5 illustrates a flowchart diagram of a method of operation 200 of an embodiment switched mode power supply (SMPS) including steps 202-224. According to various embodiments, method of operation 200 is a method for determining the sampling time for an average inductor current $i_{L\_AVG}$ in an SMPS, such as the embodiments described in reference to FIGS. 1-3, for example. Method of operation 200 may be implemented by calculation circuit 144 in FIG. 3 for determining the proper sampling point to obtain average inductor current $i_{L\_AVG}$ as described in reference to FIGS. 3, 4a, and 4b. Description of method of operation 200 is made herein with respect to SMPS 140 in FIG. 3; however, method of operation 200 may be applied to other power supply systems as will be readily apparent to one of skill in the art.

In various embodiments, step 202 includes detecting a rising edge on modulated switching signal PWM supplied by DPWM counter 146. Based on the detected rising edge, calculation circuit 144 starts an on-counter to begin counting on delay $T_{d\_ON}$ in step 204. Once the on-counter is started, on delay $T_{d\_ON}$ is incremented in step 206 based on clock signal CLK. After each increment, step 208 includes checking if switching voltage $V_{SW}$ is greater than reference voltage $V_{REF}$. If switching voltage $V_{SW}$ is greater than reference voltage $V_{REF}$, step 210 follows; otherwise, step 206 is repeated and on delay $T_{d\_ON}$ is incremented based on clock signal CLK. In various embodiments, step 208 is performed by monitoring output $SW_{COMP}$ of comparator 162. Reference voltage $V_{REF}$ may be set to indicate that switching voltage $V_{SW}$ has switched, or crossed a switching threshold, between receiving high side reference supply $V_{IN}$ and low side reference supply $V_{GND}$. In one specific embodiment, $V_{IN}$ is set to 5V, $V_{GND}$ is set to 0V, and $V_{REF}$ is set to 1.5V. Other voltages may be used in other embodiments.

In various embodiments, after switching voltage $V_{SW}$ is greater than reference voltage $V_{REF}$, step 210 follows and includes waiting for modulated switching signal PWM to undergo a falling edge. After the falling edge, calculation circuit 144 may start an off-counter to begin counting off delay $T_{d\_OFF}$ in step 212. Once the off-counter is started, off delay $T_{d\_OFF}$ is incremented in step 214 based on clock signal CLK. After each increment, step 216 includes checking if switching voltage $V_{SW}$ is less than reference voltage $V_{REF}$. If switching voltage $V_{SW}$ is less than reference voltage $V_{REF}$, step 218 follows; otherwise, step 214 is repeated and off delay $T_{d\_OFF}$ is incremented based on clock signal CLK.

According to various embodiments, after switching voltage $V_{SW}$ is less than reference voltage $V_{REF}$, step 218 follows and includes averaging on delay $T_{d\_ON}$ and off delay $T_{d\_OFF}$. In such embodiments, averaging may include a running average performed over numerous switching cycles for the SMPS. Based on the averaged on delay $T_{d\_ON}$ and off delay $T_{d\_OFF}$, step 220 includes calculating the sampling time $t_S$ according to either formula for the real middle point described above in reference to FIG. 4b. In the embodiment shown in FIG. 3, current measurement circuit 164 is arranged around the low side switch LS and, thus, the middle point and sampling time $t_S$ is calculated for the time period when the low side switch LS is closed during off time $T_{OFF}$.

In various embodiments, step 222 includes waiting for period counter count value CNT in DPWM counter 146 to reach o (or some set value if CNT arranged to increment instead of decrement), which corresponds to a completion of a single switching cycle for SMPS 140 and indicates that modulated switching signal PWM is beginning a new cycle, e.g., a new rising edge is detected. Finally, step 224 includes sending the computed sampling time $t_S$ to DPWM counter 146 and moving back to step 202 in order to repeat method of operation 200.

Figure 6:
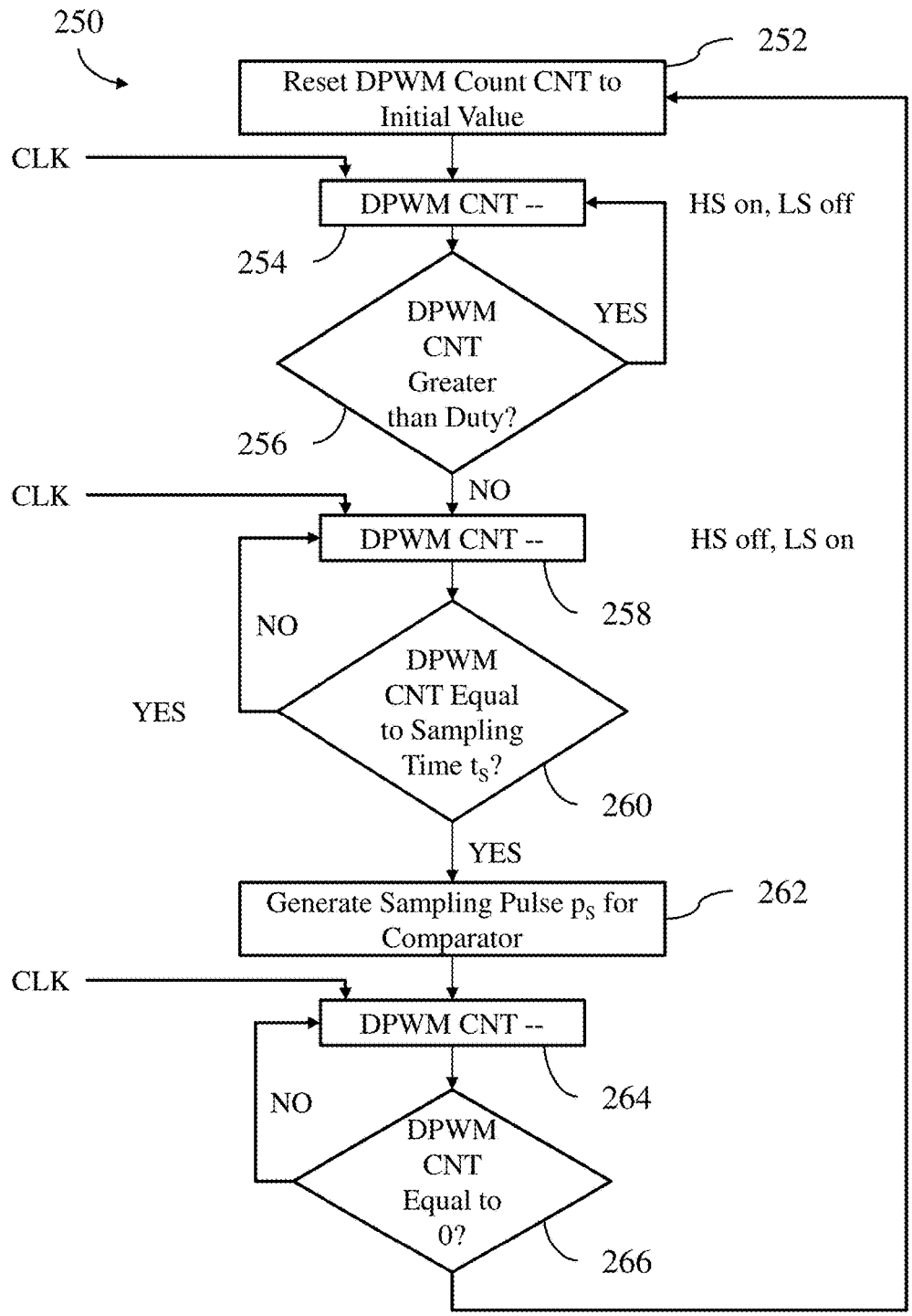
FIG. 6 illustrates a flowchart diagram of a further method of operation of an embodiment switched mode power supply.

FIG. 6 illustrates a flowchart diagram of a further method of operation 250 of an embodiment switched mode power supply (SMPS) including steps 252-266. According to various embodiments, method of operation 250 generates modulated switching signal PWM and sampling pulse $p_S$ as described in reference to SMPS 140 in FIG. 3. As such, method of operation 250 may be implemented by DPWM counter 146 in FIG. 3, according to various embodiments.

In various embodiments, steps 252 includes resetting period counter count value CNT in DPWM counter 146 to an initial value determined by the switching frequency for SMPS 140. Step 254 includes decrementing count CNT in DPWM counter 146 based on clock signal CLK. After each decrement, step 256 includes checking if count CNT in DPWM counter 146 is greater than duty cycle reference DUTY received from PID controller 148. If count CNT is not greater than duty cycle reference DUTY, step 258 follows; otherwise, step 254 is repeated and count CNT is decremented based on clock signal CLK.

If count CNT is not found to be greater than duty cycle reference DUTY, count CNT is again decremented in step 258. Following step 258, step 260 includes checking if count CNT is equal to a value corresponding to sampling time $t_S$ determined in and received from calculation circuit 144, as described in reference to FIGS. 3 and 5 above. If count CNT is equal to the sampling time $t_S$, step 262 follows; otherwise, count CNT is decremented again based on clock signal CLK by repeating step 258.

In various embodiments, step 262 includes generating and supplying sampling pulse $p_S$ to current comparator 150 in SMPS 140. Sampling pulse $p_S$ may be used to trigger the measurement of inductor current $i_L$ and the comparison between the measured inductor current $i_L$ and threshold current $i_{thresh}$. Following step 262, count CNT is again decremented in step 264. Step 266 includes checking is count CNT is equal to 0. Once count CNT is zero, method 250 may be repeated for another switching cycle by executing step 252 again. As long as count CNT is not 0, the switching cycle has not completed a full period and count CNT is decremented based on clock signal CLK by repeating step 264.

In various embodiments, during step 254 and step 256, while count CNT in DPWM counter 146 is greater than duty cycle reference DUTY, high side switch HS is on and low side switch LS is off. From the time that count CNT is not greater than duty cycle reference DUTY when step 258 begins until the time that count CNT is equal to o in step 266, the high side switch HS is off and the low side switch LS is on. In other embodiments, period count value CNT may start at zero and be incremented up to a value corresponding to the switching frequency. In some embodiments, numerous digital counters may be included, such as within DPVVM counter 146, calculation circuit 144, or digital controller 142, for example.

Figure 7:
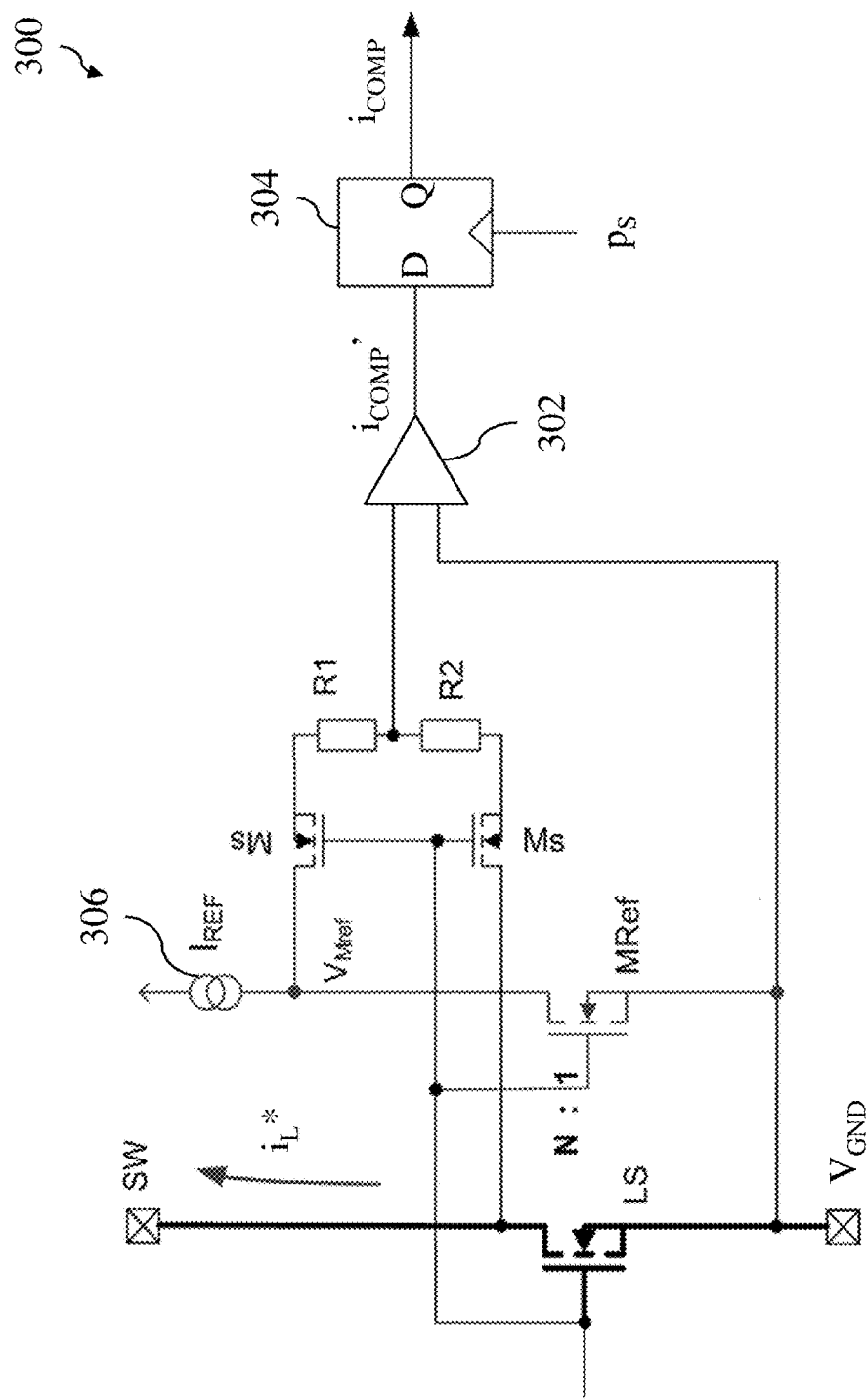
FIG. 7 illustrates a schematic of an embodiment current measurement unit.

FIG. 7 illustrates a schematic of an embodiment current measurement unit 300. According to various embodiments, current measurement unit 300 may be an implementation of current comparator 150 and current measurement circuit 164 as described above in reference to FIG. 3. Current measurement unit 300 is coupled to low side switch LS and includes transistors $M_{REF}$, $M_{S1}$, and $M_{S2}$, resistors R1 and R2, comparator 302, and D-type flip flop 304. D-type flip flop 304 outputs current comparison result $i_{COMP}$, which is supplied to digital controller 142. According to some embodiments, the threshold current $i_{thresh}$ for comparison with measured inductor current $i_L^*$ may be set according to the equation $i_{thresh} = N \cdot I_{REF} \cdot R1 \div (R1+R2)$, where $I_{REF}$ is the reference current set by current source 306. Resistors R1 and R2 may be set to any value. In some embodiments, transistors $M_{REF}$, $M_{S1}$, and $M_{S2}$ and low side switch LS are all N-type enhancement metal-oxide-semiconductor field effect transistors (MOSFETs), as shown. Alternatively, any type of transistors may be used. According to various other embodiments, current measurement circuit 164 may be implemented as other types of circuits for measuring current as are known in the art.

Figure 8:
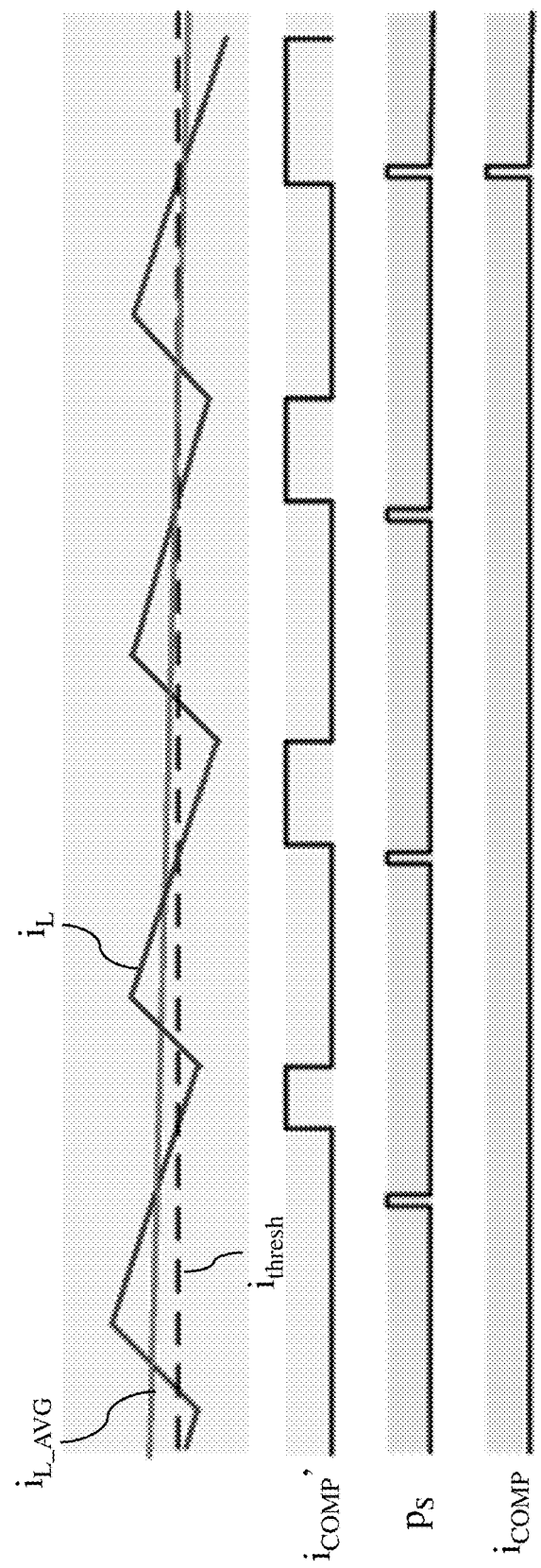
FIG. 8 illustrates a plot of further waveforms from an embodiment switched mode power supply.

FIG. 8 illustrates a plot of further waveforms from an embodiment switched mode power supply (SMPS) demonstrating determining current comparison result $i_{COMP}$ based on sampling pulse $p_S$. According to various embodiments, the average current supplied to a load for an SMPS is equal to the average inductor current $i_{L\_AVG}$. The instantaneous inductor current $i_L$ is plotted overlying average inductor current $i_{L\_AVG}$ and threshold current $i_{thresh}$. According to some embodiments, such as in current measurement unit 300 for example, an initial current comparison result $i_{COMP}'$ indicates the result of the comparison between inductor current $i_L$ and threshold current $i_{thresh}$. In such embodiments, initial current comparison result $i_{COMP}'$ is high whenever inductor current $i_L$ is below threshold current $i_{thresh}$. Note that current measurement unit 300 is connected to low side switch LS in the described embodiment and thus initial current comparison result $i_{COMP}'$ is de-asserted as soon as low side switch LS is opened and high side switch HS is closed (shown every time inductor current $i_L$ begins increasing).

In various embodiments, inductor current $i_L$ is measured at the calculated middle point based on sampling pulse $p_S$, as described above in reference to the other Figures, in order to determine average inductor current $i_{L\_AVG}$. Thus, current comparison result $i_{COMP}$ is related to average inductor current $i_{L\_AVG}$ when sampling pulse $p_S$ is asserted. In various embodiments, when sampling pulse $p_S$ is asserted during a time when initial current comparison result $i_{COMP}'$ is asserted, current comparison result $i_{COMP}$ is asserted, indicating that average inductor current $i_{L\_AVG}$ is below threshold current $i_{thresh}$. In one embodiment, D-type flip flop 304 in FIG. 7 implements this behavior by receiving a clock signal from sampling pulse $p_S$.

Figure 9:
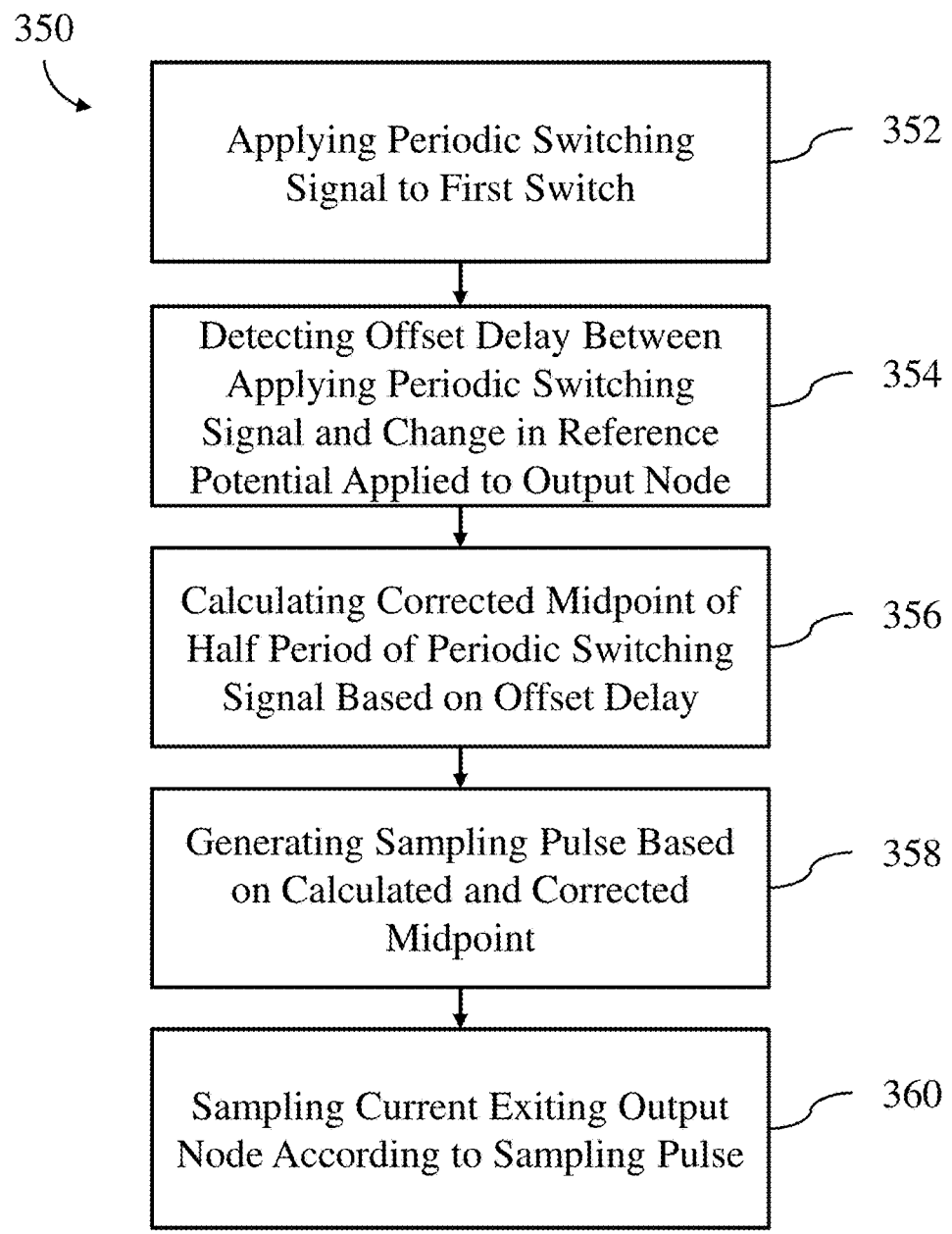
FIG. 9 illustrates a block diagram of another method of operation of an embodiment switched mode power supply.

FIG. 9 illustrates a block diagram of another method of operation 350 of an embodiment switched mode power supply (SMPS) including steps 352-360. According to various embodiments, step 352 includes applying a periodic switching signal to a first switch. The first switch is coupled to an output node of the SMPS. Step 354 includes detecting an offset delay between applying the periodic switching signal and a change in reference potential applied to the output node. For example, the delay between applying the periodic switching signal and the change in reference potential corresponds to either the on delay $T_{d\_ON}$ or the off delay $T_{d\_OFF}$ described above in reference to the other figures.

In various embodiments, step 356 includes calculating a corrected midpoint of a half period of the periodic switching signal based on the offset delay. In some embodiments, the corrected midpoint is indicated by sampling time $t_S$ as described in FIGS. 3-8. Step 358 may include generating a sampling pulse based on the calculated and corrected midpoint, such as sampling pulse $p_S$ described above in FIGS. 3-8. Step 360 includes exiting the output node according to the sampling pulse. For example, the current exiting the output node may indicate average inductor current $i_{L\_AVG}$, in some embodiments, when sampled at a time indicated by sampling pulse $p_S$. Various additions or alterations to method of operation 350 may be included within the scope of various embodiments. Further, method of operation 350 may be repeated numerous times for multiple switching cycles. Embodiments described herein are applied to specific examples of an SMPS; however, the principles included in the various embodiments may be applied to any type of switching power supply or switching circuit in other embodiments envisioned within the scope of the present disclosure.

According to an embodiment, a method of operating a switching power supply includes applying a periodic switching signal to a first switch that is coupled to an output node, detecting an offset delay between applying the periodic switching signal and a change in voltage of the output node, calculating a corrected midpoint of a half phase of the periodic switching signal based on the offset delay, generating a sampling pulse based on the corrected midpoint, and sampling a current at the output node according to the sampling pulse.

In various embodiments, the method also includes comparing the sampled current to a current threshold. The method may also include applying an inverse of the periodic switching signal to a second switch that is also coupled to the output node. In such embodiments, detecting the offset delay may include detecting a first offset delay $T_{d\_ON}$ at an on half phase when the first switch is closed and detecting a second offset delay $T_{d\_OFF}$ at an off half phase when the second switch is closed. Calculating a corrected midpoint of a half phase of the periodic switching signal may include calculating a first midpoint time $T_{mid}$ of a half phase of the periodic switching signal based on a switching frequency of the periodic switching signal and calculating the corrected midpoint of a half phase by correcting the first midpoint time $T_{mid}$ with a correction factor based on the first offset delay $T_{d\_ON}$ and the second offset delay $T_{d\_OFF}$. The corrected midpoint of a half phase may be calculated for the on half phase or the off half phase. In such embodiments, the corrected midpoint of the on half phase is equal to $T_{mid}+(T_{d\_ON}-T_{d\_OFF})/2-T_{d\_ON}$ and the corrected midpoint of the off half phase is equal to $T_{mid}+(T_{d\_ON}-T_{d\_OFF})/2+T_{d\_OFF}$.

In various embodiments, detecting the offset delay includes detecting a first edge of the periodic switching signal, repeatedly incrementing a first counter according to a clock signal once the first edge is detected, repeatedly measuring a voltage at a switching node that is coupled to the output node, comparing the voltage at the switching node to a first threshold voltage, stopping the incrementing the first counter once the voltage at the switching node passes the first threshold voltage, and determining offset delay based on the first counter. In some embodiments, calculating the corrected midpoint of the half phase of the periodic switching signal includes calculating a first midpoint of the half phase based on a switching frequency of the periodic switching signal and shifting the calculated first midpoint by the detected offset delay.

According to an embodiment, a control circuit for driving a switched power supply includes a current measurement circuit with a sampling control input and a comparison output and a controller coupled to the sampling control input and the comparison output. The current measurement circuit is configured to measure a current flowing through a switch according to a sampling signal on the sampling control input. The controller is configured to be coupled to the switch and is configured to apply a switching control signal to the switch, measure an output voltage of the switch at an output node, measure a switch delay between applying the switching control signal and a change in the output voltage of the switch, and generate the sampling signal based on a frequency of the switching control signal and the switch delay.

In various embodiments, the current measurement circuit is further configured to compare the measured current to a current threshold and generate a comparison result on the comparison output. The controller may be configured to apply the switching control signal to the switch in a first operation mode or a second operation mode based on the comparison result. During the first operation mode, the switching control signal may be applied as a pulse width modulated (PWM) signal. During the second operation mode, the switching control signal may be applied as a pulse frequency modulated (PFM) signal.

In various embodiments, the controller includes a digital pulse modulation counter configured to generate the sampling signal and the switching control signal. The controller may also include a calculation circuit with a first input configured to receive the switching control signal, a second input configured to receive an output voltage comparison signal, and an output coupled to the digital pulse modulation counter and configured to supply a sampling time. The sampling signal generated in the digital pulse modulation counter may be controlled by the sampling time. The sampling signal may be a pulse generated at the sampling time.

In various embodiments, the control circuit may also include a voltage comparator having an output coupled to the second input of the calculation circuit. In such embodiments, the voltage comparator is configured to compare the output voltage of the switch with a switching reference voltage and generate the output voltage comparison signal based on the comparison. In some embodiments, the calculation circuit and the digital pulse modulation counter are configured to operate synchronously according to a digital clock signal. The controller further includes a proportional-integral-derivative (PID) controller coupled to the digital pulse modulation counter in some embodiments. The PID controller is configured to receive a feedback error signal based on the output voltage and supply a duty signal to the digital pulse modulation counter. The duty signal is generated based on the feedback error signal.

According to an embodiment, a power supply circuit includes a pulse modulation circuit with a switch signal output, a sample time input, and sample pulse output; a switch driver coupled to the switch signal output and configured to be coupled to a high side switch and a low side switch; a timing measurement unit coupled to the switch signal output and configured to be coupled to the high side switch and the low side switch; and a current measurement unit coupled to the sample pulse output and configured to be coupled to the high side switch or the low side switch. The pulse modulation circuit is configured to supply a pulse modulated switching signal on the switch signal output and supply a sample pulse signal on the sample pulse output. The switch driver is configured to drive the high side switch and the low side switch according to the pulse modulated switching signal on the switch signal output. The timing measurement unit is configured to determine a delay time between the pulse modulated 7switching signal and switching of the high side switch and low side switch, and supply a sample time signal to the sample time input. The sample time signal is based on the pulse modulated switching signal and the determined delay time.

In various embodiments, the current measurement unit is configured to receive the sample pulse signal on the sample pulse output, measure a current flowing in the high side switch or low side switch, and generate a threshold comparison signal based on comparing the measured current with a current threshold. In such embodiments, the sample pulse signal is based on the sample time signal. The power supply circuit may also include the high side switch and the low side switch. The high side switch may be coupled between a first supply reference voltage and an output node, and the low side switch may be coupled between a second supply reference voltage and the output node.

According to various embodiments described herein, advantages may include accurate inductor current measurement and average current measurement in switching power supplies, power efficient switching control for switching power supplies, and stabilized output control for switching power supplies.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a switching power supply, the method comprising:
   applying a periodic switching signal to a first switch, wherein the first switch is coupled to an output node;
   measuring an offset delay between applying the periodic switching signal and a change in voltage of the output node;
   calculating a corrected midpoint of a half phase of the periodic switching signal based on the offset delay;
   generating a sampling pulse at the corrected midpoint; and
   comparing a current at the output node to a current threshold according to the sampling pulse, wherein measuring the offset delay comprises:
   measuring a first offset delay $T_{d\_ON}$ between a first edge of the periodic switching signal and a first change in the voltage of the output node when the first switch is closed; and
   measuring a second offset delay $T_{d\_OFF}$ between a second edge of the periodic switching signal and a second change in the voltage of the output node when the first switch is open.

2. The method of claim 1, wherein comparing the current at the output node to the current threshold according to the sampling pulse comprises:
   comparing the current at the output node to the current threshold using a comparator; and
   sampling an output of the comparator.

3. The method of claim 1, further comprising applying an inverse of the periodic switching signal to a second switch, wherein the second switch is also coupled to the output node.

4. The method of claim 1, wherein detecting the offset delay comprises:
   detecting the first edge of the periodic switching signal;
   repeatedly incrementing a first counter according to a clock signal once the first edge is detected;
   repeatedly measuring a voltage at a switching node, wherein the switching node is coupled to the output node;
   comparing the voltage at the switching node to a first threshold voltage;
   stopping the incrementing the first counter once the voltage at the switching node passes the first threshold voltage; and
   determining the offset delay based on the first counter.

5. The method of claim 1, wherein calculating the corrected midpoint of the half phase of the periodic switching signal comprises:
   calculating a first midpoint of the half phase based on a switching frequency of the periodic switching signal; and
   shifting the calculated first midpoint by the offset delay.

6. The method of claim 1, wherein comparing the current at the output node according to the sampling pulse comprises:
   mirroring a current from an output transistor to a reference transistor;
   supplying a reference current to an output node of the reference transistor; and
   measuring a voltage at the output node of the reference transistor using a comparator.

7. The method of claim 6, further comprising sampling an output of the comparator using a flip-flop.

8. The method of claim 1, wherein calculating the corrected midpoint of the half phase comprises calculating a corrected midpoint of at least one of an on half phase or an off half phase of the periodic switching signal, wherein
   the corrected midpoint of the on half phase is equal to $T_{mid}+(T_{d\_ON}-T_{d\_OFF})/2-T_{d\_ON}$, and
   the corrected midpoint of the off half phase is equal to $T_{mid}+(T_{d\_ON}-T_{d\_OFF})/2+T_{d\_OFF}$,
   where $T_{mid}$ is a midpoint time of the half phase of the periodic switching signal.

9. A control circuit for driving a switched power supply, the control circuit comprising:
   a current measurement circuit comprising a sampling control input and a comparison output, wherein the current measurement circuit is configured to measure a current flowing through a switch according to a sampling signal on the sampling control input; and
   a controller coupled to the sampling control input and the comparison output and configured to be coupled to the switch, wherein the controller is configured to:
   apply a periodic switching signal to the switch, wherein the switch is coupled to an output node,
   measure an offset delay between applying the periodic switching signal and a change in voltage of the output node;
   calculate a corrected midpoint of a half phase of the periodic switching signal based on the offset delay; and
   generate the sampling signal at the corrected midpoint, wherein the offset delay comprises a first offset delay $T_{d\_ON}$ between a first edge of the periodic switching signal and a first change in the voltage of the output node when the switch is closed, and a second offset delay $T_{d\_OFF}$ between a second edge of the periodic switching signal and a second change in the voltage of the output node when the switch is open.

10. The control circuit of claim 9, wherein the a current measurement circuit comprises:
    a reference transistor having a gate coupled to a gate of a transistor of the switch;
    a current source coupled to an output node of the reference transistor; and
    a comparator coupled to the output node of the reference transistor.

11. The control circuit of claim 9, wherein the current measurement circuit is further configured to compare the measured current to a current threshold and generate a comparison result on the comparison output.

12. The control circuit of claim 9, wherein the controller comprises a digital pulse modulation counter configured to generate the sampling signal and the periodic switching signal.

13. The control circuit of claim 12, wherein the controller further comprises a proportional-integral-derivative (PID) controller coupled to the digital pulse modulation counter, wherein the PID controller is configured to receive a feedback error signal based on an output voltage of the switched power supply and supply a duty signal to the digital pulse modulation counter, and wherein the duty signal is generated based on the feedback error signal.

14. The control circuit of claim 9, wherein
the calculated corrected midpoint of the half phase comprises a corrected midpoint of at least one of an on half phase or an off half phase of the periodic switching signal, wherein
the corrected midpoint of the on half phase is equal to $T_{mid}+(T_{d\_ON}-T_{d\_OFF})/2-T_{d\_ON}$, and
the corrected midpoint of the off half phase is equal to $T_{mid}+(T_{d\_ON}-T_{d\_OFF})/2+T_{d\_OFF}$,
where $T_{mid}$ is a midpoint time of the half phase of the periodic switching signal, delay $T_{d\_ON}$ is the first offset delay at the on half phase between a first edge of periodic switching signal.

15. The control circuit of claim 10, further comprising a flip-flop having a data input coupled to an output of the comparator and a clock input coupled to the sampling control input.

16. The control circuit of claim 10, further comprising:
a first resistor coupled between the output node of the reference transistor and an input of the comparator; and
a second resistor coupled between the output node and the input of the comparator.

17. The control circuit of claim 12, wherein the controller further comprises a calculation circuit comprising a first input configured to receive the periodic switching signal, a second input configured to receive an output voltage comparison signal, and an output coupled to the digital pulse modulation counter and configured to supply a sampling time, wherein the sampling signal generated in the digital pulse modulation counter is controlled by the sampling time.

18. A method of operating a switching power supply, the method comprising:
applying a switching control signal to a switch;
measuring an output voltage of the switch at an output node;
measuring a switch delay between applying the switching control signal and a change in the output voltage of the switch;
generate a sampling control signal at a corrected midpoint of a half phase of the switching control signal based on a frequency of the switching control signal and the switch delay; and
comparing a current at the output node to a current threshold according to the sampling control signal, wherein measuring the switch delay comprises measuring a first offset delay $T_{d\_ON}$ between a first edge of the switching control signal and a first change in the output voltage of the switch when the switch is closed, and measuring a second offset delay $T_{d\_OFF}$ between a second edge of the switching control signal and a second change in the output voltage of the switch when the switch is open.

19. The method of claim 18, wherein comparing the current at the output node to the current threshold according to the sampling control signal comprises:
comparing the current at the output node to the current threshold using a comparator; and
sampling an output of the comparator according to the sampling control signal using a flip-flop.

20. The method of claim 18, wherein:
generating the sampling control signal comprises generating the sampling control signal at a corrected midpoint of at least one of an on half phase or an off half phase of the switching control signal, wherein
the corrected midpoint of the on half phase is equal to $T_{mid}+(T_{d\_ON}-T_{d\_OFF})/2-T_{d\_ON}$, and
the corrected midpoint of the off half phase is equal to $T_{mid}+(T_{d\_ON}-T_{d\_OFF})/2+T_{d\_OFF}$,
where $T_{mid}$ is a midpoint time of the half phase of the switching control signal.

* * * * *